United States Patent [19]
Langerwerf

[11] Patent Number: 5,958,238
[45] Date of Patent: Sep. 28, 1999

[54] ANAEROBIC REMOVAL OF SULPHUR COMPOUNDS FROM WASTE WATER

[75] Inventor: Josephus Sychbertus Adrianus Langerwerf, Delft, Netherlands

[73] Assignee: Nederlandse Organisatie Voor Toegepast Natuurwetenschappelijk Onderzoek TNO, Delft, Netherlands

[21] Appl. No.: 08/765,142
[22] PCT Filed: Jun. 1, 1995
[86] PCT No.: PCT/NL95/00184
   § 371 Date: Jan. 23, 1997
   § 102(e) Date: Jan. 23, 1997
[87] PCT Pub. No.: WO96/00191
   PCT Pub. Date: Jan. 4, 1996

[30] Foreign Application Priority Data

Jun. 23, 1994 [NL] Netherlands ............................ 9401036

[51] Int. Cl.⁶ ............................................... C02F 3/28
[52] U.S. Cl. .................... 210/603; 210/631; 210/750; 95/169; 95/181; 423/576.6; 423/576.7
[58] Field of Search ............................. 95/149, 159, 169, 95/177, 181; 210/603, 605, 630, 631, 750; 423/576.6, 576.7

[56] References Cited

U.S. PATENT DOCUMENTS

| | | | |
|---|---|---|---|
| 3,754,376 | 8/1973 | Kent | 95/258 |
| 4,076,621 | 2/1978 | Hardison | |
| 4,614,588 | 9/1986 | Li | 210/603 |
| 4,735,723 | 4/1988 | Mulder | 210/603 |
| 4,774,071 | 9/1988 | Jeffrey et al. | 423/576.6 |
| 4,871,520 | 10/1989 | Olson et al. | 423/221 |
| 5,390,278 | 2/1995 | Honna et al. | 423/576.6 |
| 5,422,086 | 6/1995 | Bowman | 423/576.6 |
| 5,474,682 | 12/1995 | Buisman | 95/181 |

FOREIGN PATENT DOCUMENTS

| | | |
|---|---|---|
| 0 242 938 | 10/1987 | European Pat. Off. . |
| 0 409 480 | 1/1991 | European Pat. Off. . |
| 999799 | 7/1965 | United Kingdom ................ 423/576.6 |
| 2 149 389 | 6/1985 | United Kingdom . |
| 9110617 | 7/1991 | WIPO ................................ 423/576.6 |
| 91 16269 | 10/1991 | WIPO . |

OTHER PUBLICATIONS

Hydrocarbon Processing, vol. 54, No. 2, Feb. 1975, Houston US pp. 93–95; Takeshi Kasai 'Konox Process Removes $H_2S$'.

Primary Examiner—Jay H. Woo
Assistant Examiner—Betsey J. Morrison
Attorney, Agent, or Firm—Young & Thompson

[57] ABSTRACT

Method for anaerobic removal of a sulphur compound from waste water containing such compound, comprising the steps of: 1) feeding the waste water to an anaerobic digestion system; 2) converting the sulphur compound in the digestion system to a sulphide; 3) circulating an effluent containing the sulphide from the digestion system in a by-pass channel, the channel comprising a stripper system for stripping the sulphide from the effluent; 4) removing the sulphide from the effluent by contacting with a transporting gas in the stripper system; and 5) converting the sulphide to sulphur; wherein 6) the sulphide is absorbed from the transporting gas in an absorber system by an absorbing liquid, which absorbing liquid is passed in a closed loop through the absorber system and a regenerator system, and comprises a regenerable redox liquor, which redox liquor has a pH-value in the range of 4 to 7, preferably about 6.5.

21 Claims, 1 Drawing Sheet

ANAEROBIC REMOVAL OF SULPHUR COMPOUNDS FROM WASTE WATER

FIELD OF THE INVENTION

The invention relates to a method for anaerobic removal of a sulphur compound from waste water containing said compound, said method comprising the steps of
1) feeding the waste water to an anaerobic digestion system,
2) converting the sulphur compound in the digestion system to a sulphide,
3) circulating an effluent containing the sulphide from the digestion system in a by-pass channel, said channel comprising a stripper system for stripping the sulphide from the effluent,
4) removing the sulphide from the effluent by contacting with a transporting gas in the stripper system, and
5) converting the sulphide to sulphur.

BACKGROUND OF THE INVENTION

Anaerobic biological treatment of waste waters containing sulphates enables the quantitative conversion into sulphide. If the sulphide formed can be converted into useful by-products which can be removed from the liquid, the salt load of waste waters containing sulphate can be decreased dramatically. Application of this technology is of great interest in those cases where sulphates and sulphites are emitted by waste waters resulting from industrial processes, flue gas treatment, leachates etc.

In FR-A-2 484 990 a method is disclosed for stripping of hydrogen sulphide in a by-pass of the anaerobic reactor using biogas that is circulated between a stripper and a desulphurizing apparatus. If however this method will be applied for alkaline waste waters, the pH of the reactor liquid will rise beyond optimum values (for methanogenesis as well as for $H_2S$ stripping) due to release of carbon dioxide as a consequence of a selective hydrogen sulphide removal. The pH-value of the reactor/stripper circulation liquid will rise if carbon dioxide leaves the system. This will occur in case large amounts of carbon dioxide are removed via the desulphurising apparatus, leading to an important release of carbon dioxide in the stripper. In the publication cited, a release of carbon dioxide is described.

SUMMARY OF THE INVENTION

It is a purpose of the present invention to provide a method for removal of sulphur compounds from waste water, especially waste water being polluted with sulphates in higher concentrations (>500 g $S/m^3$). In the latter case, recovery of the sulphur compounds might be very attractive.

This purpose is reached in a method of the type mentioned above, in which according to the invention the sulphide is absorbed from the transporting gas in an absorber system by an absorbing liquid, which absorbing liquid is passed in a closed loop through the absorber system, and the transporting gas is passed in a closed loop through the stripper system and the absorber system.

Passing the absorbing liquid in a closed loop through the absorber system provides an effective way of preventing carbon dioxide being released in the step of converting the sulphide into sulphur.

Preferably, the absorbing liquid is passed through a regenerator system and comprises a regenerable redox liquor.

It is preferred that the redox liquor has a pH-value in the range 4 to 7. More preferred, the pH-value is about 6.5.

In an $H_2S$ absorber in which a regenerable redox liquid having the pH-value as specified is circulated as the absorbing liquid, absorption of carbon dioxide is prevented, whereas oxidation of the sulphide to sulphur can effectively take place.

It was found that the sulphide is well converted by a redox liquor containing a transition metal complex, for example an iron(III)hexacy-anoferrate. Sulphide oxidation by means of a transition metal complex according to the invention is followed by electrode potential controlled electrochemical regeneration of the transition metal complex.

In an embodiment of the invention the sulphide is converted by means of a redox liquor containing a chelated iron, the chelating agent being preferably ethylenediamine tetra-acetic acid (EDTA), having a concentration in the range 0.01–0.1 M, preferably 0.05 M.

It was found that, according to the invention, glycerol, if added to the redox liquor, for example in a suspension of 50 g/l, stabilizes the redox liquor by preventing the occurrence of free radical reactions. Alternatively, suspensions of $MnO_2$ (e.g. 1 g/l) or $MnCl_2 \cdot 7H_2O$ (e.g. 5 g/l) have been found effective in preventing free radical reactions.

It was further found that biological degradation of a complexing agent in the redox liquor is effectively prevented by addition of a suspension of sodium azide (for example 10 ppm) to the redox liquor.

BRIEF DESCRIPTION OF THE DRAWINGS

Other advantages and objects of the invention will become apparent from the subsequent detailed description in conjunction with the accompanying drawing, wherein.

DETAILED DESCRIPTION OF THE INVENTION

Figure 1:
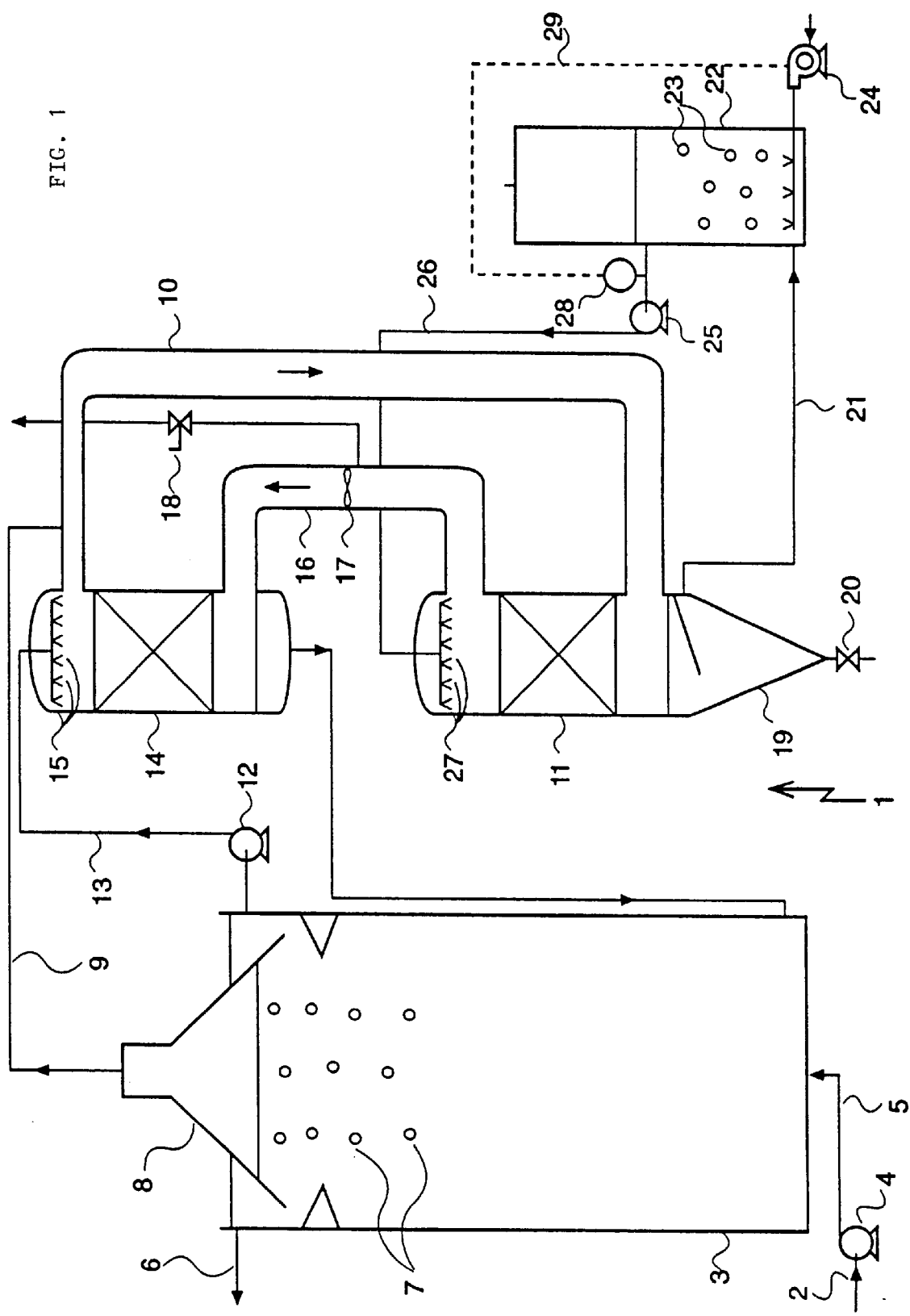
FIG. 1 is a schematic process flow diagram showing one method of practicing the invention wherein anaerobic conversion of sulphates and sulphites takes place in one reaction vessel, stripping of hydrogen sulphide takes place in a closed loop system and effective absorption/conversion of sulphide takes place by means of iron chelates contained in redox liquors circulating in a closed loop through an aerator.

FIG. 1 shows an installation 1 for biological treatment of waste water (influent) 2 containing sulphur compounds. The waste water 2 is led into an anaerobic biological reactor (digester) 3 by pump 4 via conduit 5. The effluent leaves the reactor 3 via outlet 6 and the produced biogas, schematically represented by bubbles 7, is collected in a gas dome 8 and transported by conduits 9, 10 to an absorber/reactor 11. Effluent from the digester 3 is circulated by pump 12 and conduit 13 between a stripper 14 of a trickling filter type and the digester 3. In the stripper 14 the effluent containing sulphide is introduced via orifices 15, and $H_2S$ is transferred from the aqueous phase to the gas phase. The used gas is recirculated at a high rate over absorber/reactor 11 and stripper 14 via conduits 10, 16 and fan 17. Excess sulphide-free biogas can be released via outlet valve 18. In absorber/reactor 11 the gas containing $H_2S$ is scrubbed with a liquid containing Fe(III/II) buffered at a pH 6.5. The absorbed $H_2S$ is immediately converted into elemental sulphur, which coagulates and settles in form of flocks in a settler 19. The sulphur slurry can be obtained by opening the valve 20 at the bottom of the settler 19 and can be processed further, e.g. the slurry is dewatered, whereby the recovered liquid is reintroduced into the system. The produced Fe(II)EDTA is transported via conduit 21 to aerator 22, into which air (schematically represented by bubbles 23) is introduced by means of a fan or compressor 24. In the aerator 22 Fe(II) is oxidized into Fe(III). The regenerated liquid is transported by pump 25 and conduit 26 to the absorber/reactor 11, in which the liquid is introduced via orifices 27. In order to prevent the introduction of free oxygen into the system, aeration is controlled by monitoring the oxidation potential in the liquid phase by meter 28, controlling the compressor 24 in a feedback loop 29, whereby discontinuation of introduction of air is secured at a maximum value of +150 mV with respect to NHE. Suppletion of depleted water and chemicals takes place in vessel 22.

Typical flow rate ratio's for a proper functioning of the process as applied to tannery waste water are as follows:

(digester 3 to stripper 14 liquid circulation rate via pump 12)/(influent rate via pump 4)=2 to 40;

(stripper 14 to absorber 11 gas circulation rate)/(digester 3 to stripper 14 liquid circulation rate)=10 to 300;

(absorber 11 to aerator 22 liquid circulation rate via pump 25)/(digester 3 to stripper 14 liquid circulation rate for 0.06 M Fe.EDTA)=0.1 to 0.3.

The gas and liquid flow rates in the stripper 14 and absorber 11 system are relatively high, in order to provide an intensively and repeated contact of the gas and liquid phases in the stripper 14 and the absorber 11. Both the stripper 14 and the absorber 11 are trickling filters.

EXAMPLE 1

An Upflow Anaerobic Sludge Blanket (UASB) reactor with a volume of 5 l was used for the anaerobic treatment of tannery waste water. The internal diameter of the reactor was 10 cm and its height was 65 cm. The reactor was connected through a bypass to a stripper column with an internal diameter of 5 cm. The effluent from the UASB reactor was (re)circulated by means of a peristaltic pump. The stripper column was connected to a 1 l absorber column with a height of 50 cm, containing 500 ml of 0.06 M Iron(III/II ratio 0.8) in 0.1 M EDTA of pH 6.5 in 0.2 M phosphate.

| The tannery waste water applied had the following composition: | |
| --- | --- |
| COD (total) | 6.5 g/l |
| COD (soluble) | 5.3 g/l |
| sulphate | 2.9 g/l |
| sulphide | 0.3 g/l |
| Process conditions in the UASB reactor: | |
| liquid inflow | 0.4 l/h |
| temperature | 29–30° C. |
| pH | 7.5–8.5 |
| loading rate | 6–14 kg COD/m$^3$ · d |
| retention time | 1–0.4 d |
| Process conditions in the stripper: | |
| gas flow | 30 l/h |
| Process conditions in the absorber: | |
| redox liquid | 0.06M Iron; 80% Fe(III) in 0.1M EDTA |
| pH | 6.5 |
| Performance of the UASB reactor: | |
| COD removal | 50–70% |
| sulphate to sulphite conversion | 70–95% |
| Performance of the stripper: | |
| sulphide revoval by stripping | 60% (UASB pH 8.5) |
| | 90% (UASB pH 7.5) |

EXAMPLE 2

To study the sulphur removal efficiency in more detail stripping/conversion experiments were performed by stripping aqueous solutions of 0.03 M sulphide and 0.05 M carbonate at pH-values between 7.5 and 8.5 and contacting the carrier gas ($N_2$) in a closed loop system with a redox liquor containing 0.06 M Iron EDTA at pH values between 5.5 and 8.5 keeping the FeIII/II ratio between 0.8 and 0.2 by continuous mV controlled aeration of the redox liquor in a separate aerator.

It was found that initially the best stripping results are obtained at pH-level 7.5 in the sulphide solution and 8.5 in the redox solution. However, the system is not stable: the pH in the sulphide solution rises and the stripping efficiency decreases such a way that the system is not practicable. Analogous conclusions can be drawn for all combinations of pH UASB 7.5 and 8 and pH redox liquors 8.5 and 7.5.

At pH UASB 8.5 no restrictions with regard to the pH of redox solutions appears. Unfortunately however, the required gas volume to effectively strip the sulphide is unpracticably high.

For effective sulphur removal the pH of the redox solution is lower than 7. At values below 6 absorption of the stripped hydrogen sulphide in the redox solution starts to be markedly decelerated. At pH 6.5 a practical optimum appears at which no marked carbon dioxide loss takes place during aeration; the system is stable and the gas volume needed for effectively stripping and conversion of hydrogen sulphide into sulphur is low.

EXAMPLE 3

Conversion of sulphide into sulphur at different pH values.

Solutions containing 0.2 mol $KH_2PO_4$/NaOH buffer, 0.1 mol $FeSO_4$ and 0.25 mol EDTA per litre demineralized water were adjusted at pH 6.5, 7.0 and 8.0 and aerated. Within minutes an oxidation of Fe(II) into Fe(III) could be observed by colour changing. Addition of 5 ml of a 0.1 M $Na_2S$ solution to 100 ml of the 0.1 M Fe(III)-EDTA solution immediately resulted in a rapid production of sulphur particles at all pH-values tested. The sulphur coagulation/flocculation process (turbid to flocs) took place within two hours of very moderately stirring. In all conversion experiments more than 99% of the added sulphide was oxidized into sulphur.

EXAMPLE 4

Controlled regeneration of Fe(II)EDTA.

Since the Fe(II)EDTA in spent redox liquors has to be oxidized again by aeration, the risk of introduction of free oxygen in the biogas exists. Therefore, the oxygen concentration in the regenerated liquid should be sufficiently low. A safe and effective regeneration comprises a variation of 0.8–0.2 of the Fe(III)/Fe(II) ratio between the in- and outlet of the sulphide absorption/conversion reactor. To determine the possibility of a redox potential controlled regeneration of such mixtures, the redox potential of solutions of 0.06 M Fe.EDTA with the two different ferrous/ferric ratios were measured at various pH values between 4 and 9.3. It is found that in the pH range between 6 and 8 (in which complete $H_2S$ absorption is possible and $CO_2$ absorption is limited) the redox potential of the solutions with the two ferrous/ferric ratios differed about 50 mV. Moreover, in the pH 6–6.5 range the redox potential was less pH dependent, which makes process control during aeration near pH 6.5 at a maximum value of 150 mV reliable.

I claim:

1. Method for anaerobic removal of a sulphur compound from waste water containing said compound, the method comprising the steps of:

1) feeding the waste water to an anaerobic digestion system;
2) converting the sulphur compound in the digestion system to a sulphide;
3) circulating an effluent containing the sulphide from the digestion system in a bypass channel, said channel comprising a stripper system for stripping the sulphide from the effluent;
4) removing the sulphide from the effluent by contacting with a transporting gas in the stripper system; and
5) converting the sulphide to sulphur;

wherein the sulphide is absorbed from the transporting gas in an absorber system by an absorbing liquid, which absorbing liquid is passed in a first closed loop through the absorber system thereby minimizing release of carbon dioxide in the step of converting the sulphide to sulfur, and the transporting gas is passed in a second closed loop through the stripper system and the absorber system.

2. Method according to claim 1, wherein the absorbing liquid is passed through a regenerator system and comprises a regenerable redox liquor.

3. Method according to claim 2, wherein the redox liquor has a pH value ranging from 4 to 7.

4. Method according to claim 3, wherein the pH value is about 6.5.

5. Method according to claim 2, wherein the redox liquor contains a transition metal complex.

6. Method according to claim 5, wherein the transition metal complex is an iron (III) hexacyanoferrate.

7. Method according to claim 5, wherein the transition metal complex is regenerated electrochemically.

8. Method according to claim 2, wherein the redox liquor is regenerated by aeration.

9. Method according to claim 2, wherein the redox liquor contains a chelated iron.

10. Method according to claim 9, wherein the chelating agent is ethylenediamine tetra-acetic acid (EDTA).

11. Method according to claim 10, wherein the EDTA concentration in the redox liquor ranges from 0.01 to 0.1M.

12. Method according to claim 11, wherein the EDTA concentration is about 0.05M.

13. Method according to claim 9, further comprising a step of mV-controlled aeration of the redox liquor to obtain a concentration ratio of chelated Fe(III)/Fe(II) ranging from 0.8 to 0.2.

14. Method according to claim 13, wherein the concentration ratio is about 0.25.

15. Method according to claim 1, wherein the ratio between the flow rates of the transporting gas 4) and the circulating effluent in step 3) is in the range of 10 to 300.

16. Method according to claim 1, wherein the stripping of the sulphide is performed in a trickling filter.

17. Method according to claim 1, wherein the absorbing of the sulphide is performed in a trickling filter.

18. Method according to claim 2, further comprising adding a sufficient amount of glycerol to the redox liquor to prevent free radical reactions.

19. Method according to claim 2, further comprising adding a suspension of $MnO_2$ in a sufficient amount to the redox liquor to prevent free radical reactions.

20. Method according to claim 2, further comprising adding a suspension of $MnCl_2$ in a sufficient amount to the redox liquor to prevent free radical reactions.

21. Method according to claim 2, further comprising adding a suspension of sodium azide in a sufficient amount to the redox liquor to prevent free radical reactions.

* * * * *